United States Patent [19]

Matsumoto et al.

[11] Patent Number: 4,863,637

[45] Date of Patent: Sep. 5, 1989

[54] PROCESS FOR TREATING WASTE LIQUIDS OF ACID DECONTAMINATION AGENTS

[75] Inventors: Hiroyo Matsumoto; Akira Kakimoto; Iwao Nakayasu, all of Hyogo; Kazuo Yonekura, Osaka, all of Japan

[73] Assignee: Mitsubishi Jukogyo Kabushiki Kaisha, Tokyo, Japan

[21] Appl. No.: 262,424

[22] Filed: Oct. 25, 1988

[30] Foreign Application Priority Data

Nov. 5, 1987 [JP] Japan ................................ 62-278312

[51] Int. Cl.[4] .......................... C02F 9/00; G21F 9/12; G21F 9/16

[52] U.S. Cl. .................................... 252/628; 210/668; 210/669; 210/682; 210/694; 210/751; 252/631; 252/632

[58] Field of Search ............... 210/663, 668, 669, 682, 210/694, 751; 252/628, 631, 632

[56] References Cited

U.S. PATENT DOCUMENTS

| | | | |
|---|---|---|---|
| 3,985,648 | 10/1976 | Casolo | 210/669 |
| 4,056,482 | 11/1977 | Schmieder et al. | 252/628 |
| 4,804,498 | 2/1989 | Mizuno et al. | 252/632 |

*Primary Examiner*—Ivars Cintins

*Attorney, Agent, or Firm*—Toren, McGeady & Associates

[57] ABSTRACT

A new process for treating waste liquids of acid decontamination agent is disclosed which comprises the steps of neutralizing a waste liquid of acid decontamination agents with an alkali, filtering out suspended matter from the neutralized waste liquid using a filter, removing inhibitors from the filtered waste liquid by adsorption with activated charcoal, removing radioactive ions from the waste liquid treated by activated charcoal with a chelate resin, concentrating the chelate resin-treated waste liquid by evaporation, and bituminizing the concentrate obtained in the preceding step.

2 Claims, 1 Drawing Sheet

PROCESS FOR TREATING WASTE LIQUIDS OF ACID DECONTAMINATION AGENTS

FIELD OF THE INVENTION AND RELATED ART STATEMENT

The present invention relates to a process for treating waste liquids of acid decontamination agents which result from washing equipment contaminated by radioactivity with a cleaning fluid.

A method is known for decontaminating contaminated equipment using an organic acid such as oxalic acid and citric acid as a cleaning fluid. The waste liquid of such an acid decontamination agent is usually disposed of after solidification by cementation because of their radioactivity. However, it is desirable that such waste liquids of acid decontamination agents be solidified by bituminization (asphalt solidification) capable of more effective volume reduction. Unfortunately, bituminization is impracticable for waste liquids containing organic acids (such as oxalic acid and citric acid), inhibitors, LiOH, and radioactivity for the reasons mentioned below.

(1) Since these waste liquids contain inhibitors which bring about foaming during evaporation and concentration, the separation of radioactivity of an evaporator becomes less effective.

(2) The waste liquids also contain organic acids which promote corrosion of the evaporator.

(3) The waste liquids have high radioactivity which contaminates the evaporator and bituminizing apparatus and also creates a danger of exposoure during operation.

OBJECT AND SUMMARY OF THE INVENTION

The present invention has been made in view of the prior art technology mentioned above. It is an object of the present invention to provide a process for treating waste liquids of acid decontamination agents by bituminization.

According to the process of the present invention, a waste liquid of acid decontamination agents is treated by the steps of (1) neutralizing the waste liquid of acid decontamination agents with an alkali, (2) filtering out suspended matter from the neutralized waste liquid using a filter, (3) removing inhibitors from the filtered waste liquid by adsorption with activated charcoal, (4) removing ionic radioactivity from the waste liquid treated by activated charcoal with a chelate resin, (5) concentrating the waste liquid thus treated by evaporation, and (6) bituminizing the concentrated obtained in the preceding step.

DETAILED DESCRIPTION OF THE PREFERRED EMBODIMENTS

Figure 1:
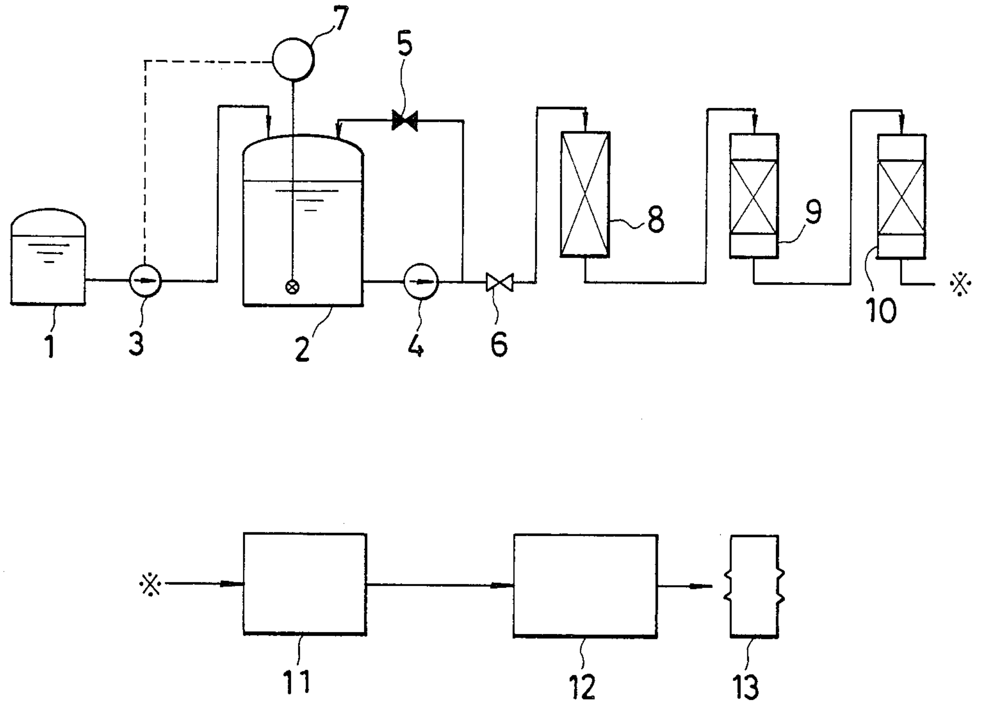
FIG. 1 is a schematic diagram showing an embodiment of the present invention.

The process of the present invention starts with neutralizing a waste liquid of acid decontamination agents with an alkali, thereby adjusting its pH value to 6.5~7.5. The alkali that can be used for neutralization includes, for example, NaOH, KOH, and LiOH.

The neutralized waste liquid is subsequently filtered for removal of suspended matter. This step may be done using a bobbin-shaped filter or a membrane filter that is capable of filtering out particles of about 1 to 10 μm in diameter.

The filtered waste liquid free of suspended matter is subsequently treated with activated charcoal for removal of inhibitors. Activated charcoal derived from coconut or coal would suit this step.

The inhibitor-free waste liquid is freed of ionic radioactive materials ($^{58}Co$, $^{60}Co$, $^{54}Mn$, $^{59}Fe$, etc.) with a chelate resin. The chelate resin includes, for example, a compound of the formula below which is formed by introducing imino-diacetate groups into styrene-divinylbenzene copolymer,

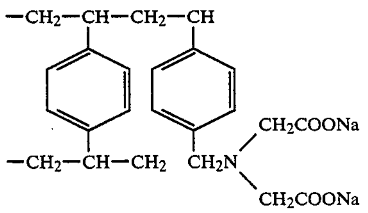

and a compound of the formula below which is formed by introducing polyamine groups into styrene-divinylbenzene copolymer.

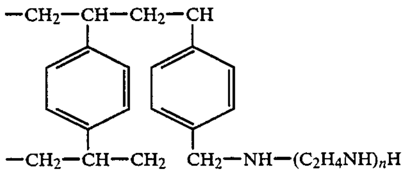

(Here, n is an integer.)

The chelate resin reacts with ionic radioactive materials as illustrated below.

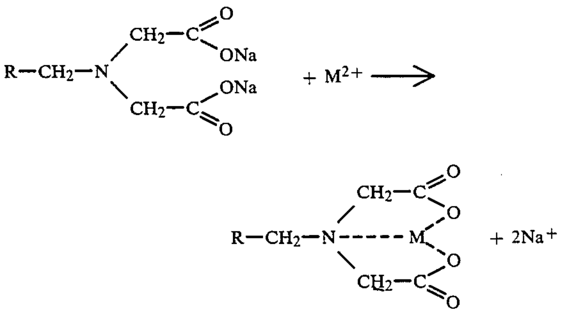

where R denotes the skeleton of the chelate resin, and $M^{2+}$ denotes a radioactive ion.

The waste liquid which has undergone the abovementioned steps for neutralization and the removal of suspended matter, inhibitors, and ionic radiactive materials can be readily concentrated by any existing evaporator because it is no longer corrosive and foaming and has an extremely low level of ionic radioactivity. The resulting concentrate can be bituminized in a usual way to reduce its volume to a great extent.

EMBODIMENT

An embodiment of the present invention will be described with reference to the schematic diagram shown in FIG. 1.

In FIG. 1, there is shown a waste liquid tank 2 to store a waste liquid of acid decontamination agents containing organic acids (citric acid and oxalic acid, for example), inhibitors, LiOH, and radioactive materials. To this waste liquid is added NaOH from an alkali tank 1 by means of a supply pump 3, so that the waste liquid is adjustd to approximately pH 7. This neutralization step makes the corrosive organic acids harmless. During the neutralization, the waste liquid in the waste liquid tank 2 is stirred by a waste liquid transfer pump 4, with a valve 5 opened and another valve 6 closed. The pH of the waste liquid is controled by regulating the supply pump 3 according to signals from a pH meter 7. When the neutralization of the waste liquid is completed, the valve 5 is closed and the valve 6 is opened and the neutralized waste liquid is transferred to a cartridge-type filter 8 (with an effective mesh of about 0.5 μm) for removal of crud and suspended matter. The filtered waste liquid is subsequently transferred to an activated charcoal column 9 (containing 50 l of activated carbon for 300 l/hr of waste liquid) for removal of inhibitors which may cause the waste liquid to foam. The waste liquid is finally transferred to a chelate resin column 10 (containing 50 l of chelate resin for 300 l/hr of waste liquid) for removal of ionic radioactive materials. (The chelate resin may be the one that is formed by introducing amino-diacetate groups into the styrene-divinylbenzene copolymer produced by Takeda Seiyaku Co., Ltd.) The waste liquid which is now free of suspended matter, foaming components, radioactivity, and corrosive substances after having undergone the abovementioned steps, is sufficiently concentrated by a conventional evaporator 11. The concentrate is then bituminized at 200° C. by means of a bituminizing apparatus 12 and becomes a bituminized solid 13.

The process of the present invention compares favorably with the conventional cementation process as shown below.

| | Foaming in evaporator | Corrosiveness | Radioactivity | Exposure dose | Volume of solidified mass | Cost |
|---|---|---|---|---|---|---|
| Present invention | None | None | 1 | 1 | 1 | 1 |
| Conventional process | Yes | Yes | 1000 | 10 | 4 | 2 |

The process of the present invention permits waste liquids of acid decontamination agents to be disposed of by bituminization capable of volume reduction to a great extent. Therefore, it produces a pronounced industrial effect.

We claim:

1. A process for treating waste liquids of acid decontamination agents which comprise the steps of neutralizing a waste liquid of acid decontamination agents with an alkali, filtering out suspended matter from the neutralized waste liquid using a filter, removing inhibitors from the filtered waste liquid by adsorption with activated charcoal, removing ionic radioactivity from the waste liquid treated by activated charcoal with a chelate resin, concentrating the chelate resin-treated waste liquid by evaporation, and bituminizing the concentrate obtained in the preceding step.

2. A process for treating a waste liquid of acid decontamination agents as set forth in claim 1, wherein the waste liquid of acid decontamination agents contains organic acids, inhibitors, LiOH, and radioactivity.

* * * * *